United States Patent
Dunn et al.

(10) Patent No.: US 10,768,962 B2
(45) Date of Patent: Sep. 8, 2020

(54) EMULATING MODE-BASED EXECUTE CONTROL FOR MEMORY PAGES IN VIRTUALIZED COMPUTING SYSTEMS

(71) Applicant: VMware, Inc., Palo Alto, CA (US)

(72) Inventors: David Dunn, Sammamish, WA (US); Doug Covelli, Camridge, MA (US)

(73) Assignee: VMware, Inc., Palo Alto, CA (US)

( * ) Notice: Subject to any disclaimer, the term of this patent is extended or adjusted under 35 U.S.C. 154(b) by 184 days.

(21) Appl. No.: 15/383,605

(22) Filed: Dec. 19, 2016

(65) Prior Publication Data

US 2018/0173551 A1 Jun. 21, 2018

(51) Int. Cl.
| | | |
|---|---|---|
| *G06F 9/455* | (2018.01) | |
| *G06F 12/1009* | (2016.01) | |
| *G06F 12/1036* | (2016.01) | |
| *G06F 12/109* | (2016.01) | |
| *G06F 12/14* | (2006.01) | |
| *G06F 12/1027* | (2016.01) | |

(52) U.S. Cl.
CPC ...... *G06F 9/45558* (2013.01); *G06F 12/1009* (2013.01); *G06F 12/109* (2013.01); *G06F 12/1027* (2013.01); *G06F 12/1036* (2013.01); *G06F 12/1475* (2013.01); *G06F 12/1491* (2013.01); *G06F 9/455* (2013.01); *G06F 2009/45583* (2013.01); *G06F 2212/1052* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 7,487,314 B1* | 2/2009 | Agesen | ............... | G06F 12/1027 711/150 |
| 8,490,085 B2* | 7/2013 | Devaux | ............... | G06F 12/1491 712/220 |
| 8,578,483 B2* | 11/2013 | Seshadri | ................. | G06F 21/57 726/22 |
| 9,292,328 B2* | 3/2016 | Pratt | .................. | G06F 9/45545 |
| 10,114,768 B2* | 10/2018 | Hildesheim | ......... | G06F 12/1483 |
| 10,216,927 B1* | 2/2019 | Steinberg | ................ | G06F 21/53 |
| 10,447,728 B1* | 10/2019 | Steinberg | ................ | G06F 21/00 |
| 2006/0004944 A1* | 1/2006 | Vij | ...................... | G06F 12/1491 711/6 |
| 2006/0047958 A1* | 3/2006 | Morais | .................... | G06F 21/51 713/166 |

(Continued)

*Primary Examiner* — Abu Zar Ghaffari
(74) *Attorney, Agent, or Firm* — Patterson + Sheridan, LLP (57) ABSTRACT

A method of emulating nested page table (NPT) mode-based execute control in a virtualized computing system includes: providing NPT mode-based execute control from a hypervisor to a virtual machine (VM) executing in the virtualized computing system; generating a plurality of shadow NPT hierarchies at the hypervisor based on an NPT mode-based execute policy obtained from the VM; configuring a processor of the virtualized computing system to exit from the VM to the hypervisor in response to an escalation from a user privilege level to a supervisor privilege level caused by guest code of the VM; and exposing a first shadow NPT hierarchy of the plurality of shadow NPT hierarchies to the processor in response to an exit from the VM to the hypervisor due to the escalation from the user privilege level to the supervisor privilege level.

19 Claims, 6 Drawing Sheets

(56) References Cited

U.S. PATENT DOCUMENTS

| | | | | |
|---|---|---|---|---|
| 2009/0037911 A1* | 2/2009 | Ahuja | G06F 9/5044 | 718/100 |
| 2009/0187729 A1* | 7/2009 | Serebrin | G06F 9/455 | 711/206 |
| 2009/0313445 A1* | 12/2009 | Pandey | G06F 9/4856 | 711/162 |
| 2010/0031360 A1* | 2/2010 | Seshadri | G06F 21/57 | 726/24 |
| 2010/0250869 A1* | 9/2010 | Adams | G06F 12/1063 | 711/154 |
| 2011/0225381 A1* | 9/2011 | Suto | G11C 11/5628 | 711/162 |
| 2012/0011508 A1* | 1/2012 | Ahmad | G06F 12/1009 | 718/1 |
| 2013/0205106 A1* | 8/2013 | Tati | G06F 3/061 | 711/159 |
| 2013/0326519 A1* | 12/2013 | Anderson | G06F 9/45533 | 718/1 |
| 2014/0053272 A1* | 2/2014 | Lukacs | G06F 21/53 | 726/24 |
| 2014/0068612 A1* | 3/2014 | Torrey | G06F 21/60 | 718/1 |
| 2015/0082304 A1* | 3/2015 | Hepkin | G06F 21/53 | 718/1 |
| 2015/0356023 A1* | 12/2015 | Peter | G06F 12/1036 | 711/208 |
| 2015/0370628 A1* | 12/2015 | Zmudzinski | G06F 21/60 | 711/133 |
| 2015/0370724 A1* | 12/2015 | Lutas | G06F 12/145 | 711/163 |
| 2016/0188354 A1* | 6/2016 | Goldsmith | G06F 9/50 | 718/1 |
| 2016/0210069 A1* | 7/2016 | Lutas | G06F 3/0664 | |
| 2018/0060249 A1* | 3/2018 | Tsirkin | G06F 12/1408 | |
| 2018/0247069 A1* | 8/2018 | Tang | G06F 21/52 | |
| 2018/0307516 A1* | 10/2018 | Dabak | G06F 9/45558 | |
| 2019/0042295 A1* | 2/2019 | Ma | G06F 9/45558 | |

* cited by examiner

EMULATING MODE-BASED EXECUTE CONTROL FOR MEMORY PAGES IN VIRTUALIZED COMPUTING SYSTEMS

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," incudes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Software executing in a virtual machine includes an executive, such as a guest operating system (OS). Some actions taken by a guest OS cause program execution to exit to the hypervisor (referred to as a "VM exit"). In some cases, the executive in a virtual machine is a hypervisor (inner hypervisor) that provides execution environment(s) for further virtual machines (inner virtual machines). Nesting hypervisors and virtual machines can result in decreased performance.

SUMMARY

One or more embodiments provide emulation of mode-based execute control for memory pages in virtualized computing systems. In an embodiment, a method of emulating nested page table (NPT) mode-based execute control in a virtualized computing system includes: providing NPT mode-based execute control from a hypervisor to a virtual machine (VM) executing in the virtualized computing system; generating a plurality of shadow NPT hierarchies at the hypervisor based on an NPT mode-based execute policy obtained from the VM; configuring a processor of the virtualized computing system to exit from the VM to the hypervisor in response to an escalation from a user privilege level to a supervisor privilege level caused by guest code of the VM; and exposing a first shadow NPT hierarchy of the plurality of shadow NPT hierarchies to the processor in response to an exit from the VM to the hypervisor due to the escalation from the user privilege level to the supervisor privilege level.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
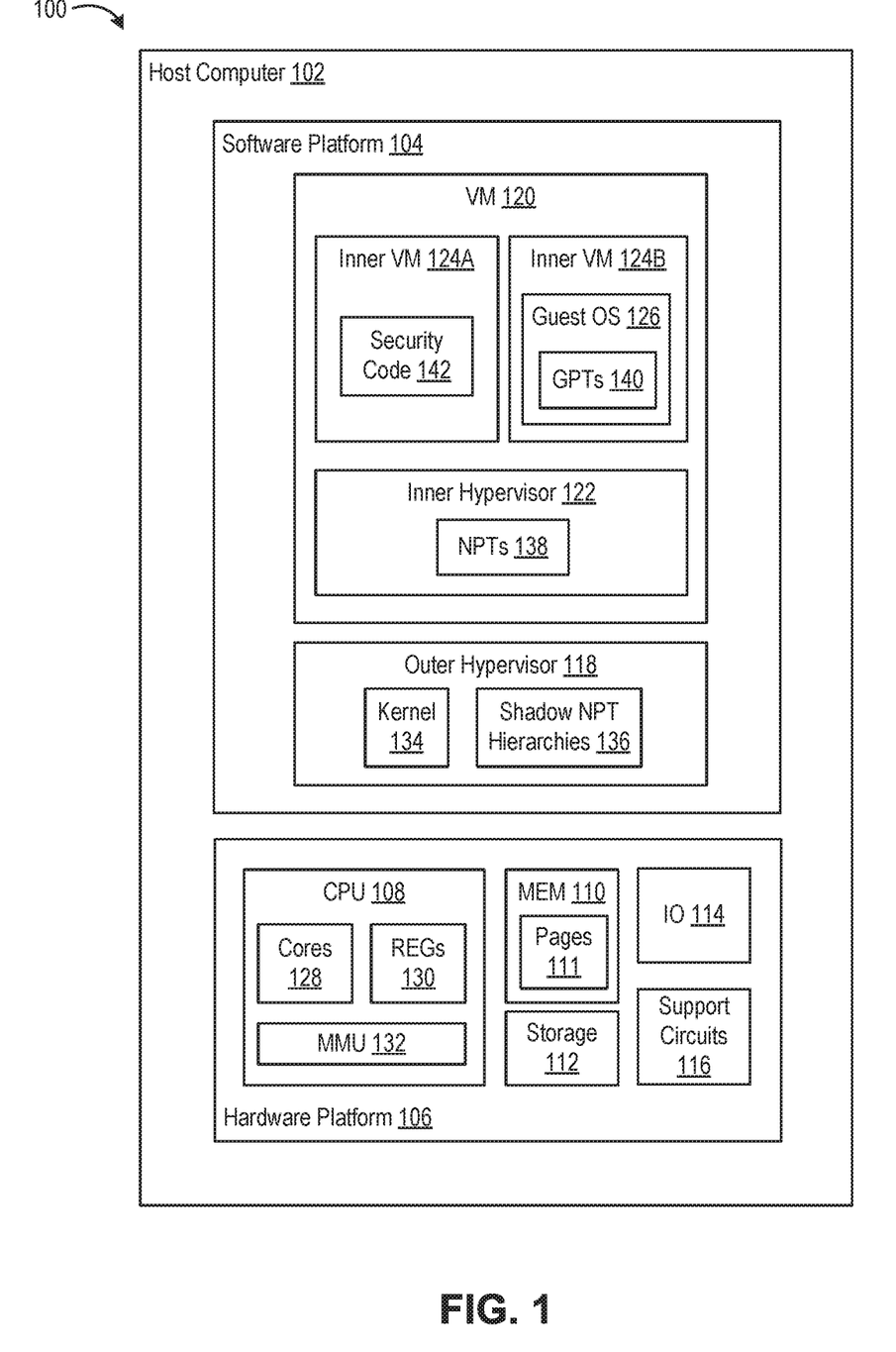
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (TO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Input/output devices 114 include conventional interfaces known in the art, such as one or more network interfaces. Support circuits 116 include conventional cache, power supplies, clock circuits, data registers, and the like.

Figure 2:
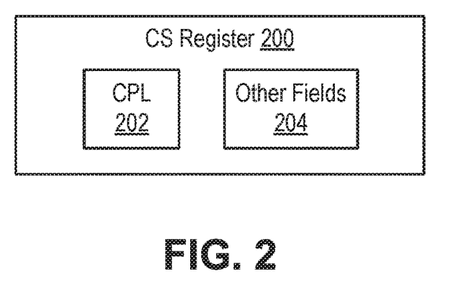
FIG. 2 is a block diagram depicting a register in the virtualized computing system of FIG. 1 that stores a current privilege level (CPL) according to an embodiment.

CPU 108 includes one or more cores 128, various registers 130, and a memory management unit (MMU) 132. Each core 128 is a microprocessor, such as an x86 microprocessor. Registers 130 include program execution registers for use by code executing on cores 128 and system registers for use by code to configure CPU 108. Code is executed on CPU 108 at a particular privilege level selected from a set of privilege levels. For example, x86 microprocessors from Intel Corporation include four privilege levels ranging from level 0 (most privileged) to level 3 (least privileged). Privilege level 3 is referred to herein as "a user privilege level" and privilege levels 0, 1, and 2 are referred to herein as "supervisor privilege levels." Code executing at the user privilege level is referred to as user-mode code. Code executing at a supervisor privilege level is referred to as supervisor-mode code or kernel-mode code. Other CPUs can include a different number of privilege levels and a different numbering scheme. In CPU 108, at least one register 130 stores a current privilege level (CPL) of code executing thereon. FIG. 2 is a block diagram depicting a code segment (CS) register 200 that stores a current privilege level (CPL) 202 for code executing on CPU 108 having x86 microprocessor core(s). CS register 200 can store various other fields 204 that specify a current segment of code.

Returning to FIG. 1, MMU 132 supports paging of system memory 110. Paging provides a "virtual memory" environment where a virtual address space is divided into pages, which are either stored in system memory 110 (e.g., pages 111) or in storage 112. "Pages" are individually addressable units of memory. Each page (also referred to herein as a "memory page") includes a plurality of separately addressable data words, each of which in turn includes one or more bytes. Pages are identified by addresses referred to as "page numbers." CPU 108 can support one or more page sizes. For example, modern x86 CPUs can support 4 kilobyte (KB), 2 megabyte (MB), 4 MB, and 1 gigabyte (GB) page sizes. Other CPUs may support other page sizes.

Figure 3:
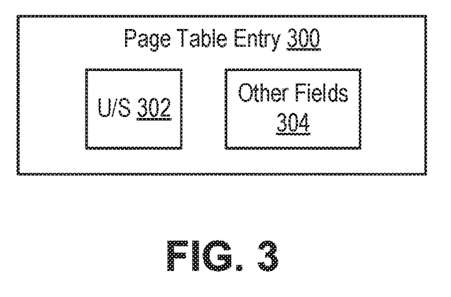
FIG. 3 is a block diagram depicting an entry in a page table structure of the virtualized computing system of FIG. 1 according to an embodiment.

MMU 132 translates virtual addresses in the virtual address space (also referred to as virtual page numbers) into physical addresses of system memory 110 (also referred to as machine page numbers). MMU 132 also determines access rights for each address translation. An executive (e.g., operating system, hypervisor, etc.) exposes a hierarchy of page tables to CPU 108 for use by MMU 132 to perform address translations. A page table hierarchy can be exposed to CPU 108 by writing pointer(s) to control registers and/or control structures accessible by MMU 132. Page tables can include different types of paging structures depending on the number of levels in the hierarchy. A paging structure includes entries, each of which specifies an access policy and a reference to another paging structure or to a memory page. The access policy for a page can include a read/write permission and a user/supervisor permission. For page-level protection, "user-mode" corresponds to the user privilege level (e.g., CPL3) and "supervisor-mode" corresponds to any supervisor privilege level (e.g., CPL0). FIG. 3 is a block diagram depicting an entry 300 in a page table structure having a mode field (U/S) 502 that specifies user mode access or supervisor mode access. Entry 300 can include various other fields 304 depending on the type of paging structure, including fields that control read and write access.

Returning to FIG. 1, CPU 108 can include hardware-assisted virtualization features, such as support for hardware virtualization of MMU 118. For example, modern x86 processors commercially available from Intel Corporation include support for MMU virtualization using extended page tables (EPTs). Likewise, modern x86 processors from Advanced Micro Devices, Inc. include support for MMU virtualization using Rapid Virtualization Indexing (RVI). Other processor platforms may support similar MMU virtualization. In general, CPU 108 can implement hardware MMU virtualization using nested page tables (NPTs). In a virtualized computing system, a guest OS in a VM maintains page tables (referred to as guest page tables) for translating virtual addresses to physical addresses for a virtual memory provided by the hypervisor (referred to as guest physical addresses). The hypervisor maintains NPTs that translate guest physical addresses to physical addresses for system memory 110 (referred to as machine addresses). Each of the guest OS and the hypervisor exposes the guest paging structures and the NPTs, respectively, to the CPU 108. MMU 132 translates virtual addresses to machine addresses by walking the guest page structures to obtain guest physical addresses, which are used to walk the NPTs to obtain machine addresses.

Figure 4:
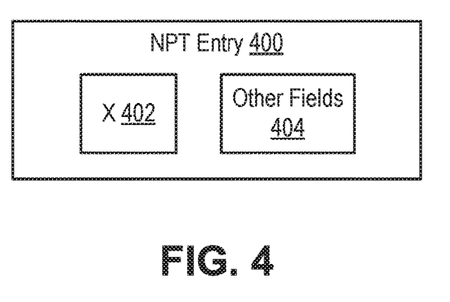
FIG. 4 is a block diagram depicting an entry in a first type of nested page table (NPT) structure of the virtualized computer system of FIG. 1 according to an embodiment.
Figure 5:
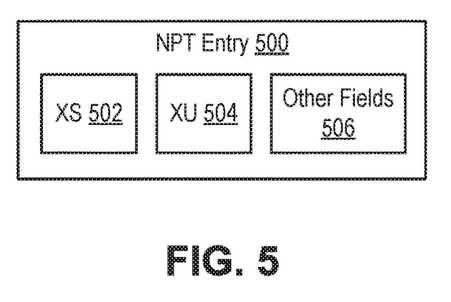
FIG. 5 is a block diagram depicting an entry in a second type of NPT structure of the virtualized computer system of FIG. 1 according to embodiment.

In an embodiment, MMU 132 supports NPTs having access policies that include execute control (also referred to herein as mode-agnostic execute control). Each entry in an NPT structure can include bit(s) that specify execute access, i.e., whether CPU 108 can fetch instructions from a given page. FIG. 4 is a block diagram depicting an entry 400 in an NPT structure that includes a field (X) that specifies execute access. Entry 400 includes various other fields 404 depending on the type of NPT structure, including fields that control read access and write access. Other types of CPUs can support different types of access policies. For example, some x86 microprocessors support NPTs having access policies that include mode-based execute control. In such a scheme, each entry in an NPT structure can include bits that specify user-mode execute access and supervisor-mode execute access. FIG. 5 is a block diagram depicting an entry 500 in an NPT structure that includes a field (XS) 502 that specifies supervisor-mode execute access and a field (XU) 504 that specifies user-mode execute access. For NPT execute protection, "user-mode" corresponds to the user privilege level (e.g., CPL3) and "supervisor-mode" corresponds to any supervisor privilege level (e.g., CPL0). Entry 500 can include various other fields 506 depending on the type of NPT structure, including fields that control read access and write access.

Returning to FIG. 1, software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes outer hypervisor 118 that supports a VM 120. One example of outer hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Although only one VM 120 is shown in the example, outer hypervisor 118 can concurrently support multiple VMs. Outer hypervisor 118 includes a kernel 134. Kernel 134 maintains NPTs on behalf of its VM(s), which are exposed to CPU 108. In particular, kernel 134 maintains a plurality of shadow NPT hierarchies 136 for VM 120, as described further herein.

Each VM supported by outer hypervisor 118 includes guest software (also referred to as guest code) that runs on the virtualized resources supported by hardware platform 106. In the example shown, the guest software of VM 120 includes an inner hypervisor 122 that supports an inner VM 124A and an inner VM 124B (collectively referred to as inner VMs 124). Inner hypervisor 122 and outer hypervisor 118 can be homogeneous (e.g., two nested instances of ESXi™) or heterogeneous (e.g., Hyper-V® nested within ESXi™). Although two inner VMs 124 are shown in the example, inner hypervisor 122 can support one or more inner VMs. Each inner VM 124 includes guest software that runs on virtualized resources provided by inner hypervisor 122 (which are in turn backed by virtualized resources provided by outer hypervisor 118). The guest software of inner VM(s) 124 is referred to herein as "inner guest software" or "inner guest code." In the example shown, the inner guest software of inner VM 124A is security code 142 and the inner guest software of inner VM 124B is a guest OS 126.

In an embodiment, the guest software inside VM 120 implements a virtualization-based security (VBS) scheme. For example, modern Microsoft Windows® operating systems support VBS. Inner hypervisor 122 separates an OS into multiple VMs, where one VM (e.g., inner VM 124B) includes the OS kernel and other parts of the OS (e.g., guest OS 126), and another VM (e.g., inner VM 124A) includes code integrity checking software and other security software (e.g., security code 142). Inner hypervisor 122 enforces read, write, and execute permissions across guest physical pages using NPTs 138. Inner hypervisor 122 assigns a higher trust level to inner VM 124A than to inner VM 124B. Inner hypervisor 122 allows security code 142 to modify NPTs 138 in order to implement a code integrity scheme. For example, security code 142 can mark pages storing unsigned code as user-only executable. Security code 142 can mark pages storing signed code as supervisor-and-user executable. In this manner, security code 142 prevents unsigned malicious software from executing in guest OS 126 even if such software gains a supervisor privilege level. NPTs 138 can employ mode-based execute control to implement the security policy maintained by security code 142. In an embodiment, NPTs 138 mark pages storing unsigned code as XU and pages storing signed code as XS+XU (both supervisor-mode and user-mode executable). As described further herein, outer hypervisor 118 can emulate NPT mode-based execute control in cases where MMU 132 of CPU 108 supports only NPT mode-agnostic execute control.

The techniques for emulating NPT mode-based execute control described herein is not limited to VBS applications. In general, VM 120 includes inner hypervisor 122, which supports one or more inner VMs 124. Inner VM(s) 124 execute inner guest software that maintains guest page tables (GPTs) 140 (e.g., guest OS 126). Inner hypervisor 122 maintains NPTs 138, which implement a mode-based execute access policy. The execute access policy of NPTs 138 can mark each page for supervisor-mode-only execute access (e.g., setting only the XS field), supervisor-and-user-mode execute access (e.g., setting both XS and XU fields), or user-only-mode execute access (setting only the XU field). In some embodiments, the execute access policy of NPTs 138 does not mark any pages for supervisor-only-mode execute access (e.g., the VBS scheme discussed above). The inner guest software exposes GPTs 140 to CPU 108. NPTs 138, however, are not directly exposed to CPU 108. Rather, outer hypervisor 118 virtualizes MMU 132 and maintains different shadow NPT hierarchies 136 on behalf of VM 120.

Figure 6:
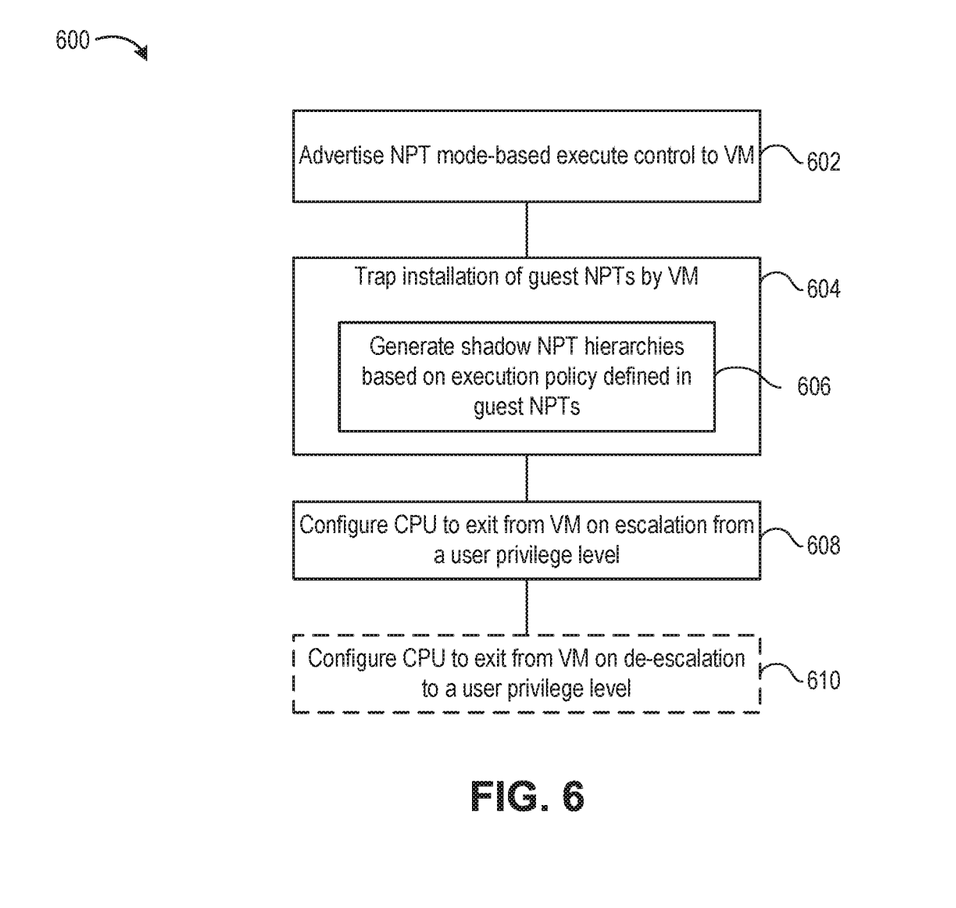
FIG. 6 is a flow diagram depicting a method of emulating NPT mode-based execute control in a virtualized computing system according to an embodiment.

FIG. 6 is a flow diagram depicting a method 600 of emulating NPT mode-based execute control in a virtualized computing system according to an embodiment. Method 600 can be performed by outer hypervisor 118 in virtualized computing system 100 of FIG. 1. Method 600 begins at step 602, where outer hypervisor 118 advertises NPT mode-based execute control to VM 120. For example, CPU 108 can include various virtual machine extensions that provide hardware support for virtualization. Outer hypervisor 118 can expose zero or more of these virtual machine extensions to its VMs. Outer hypervisor 118 can also emulate virtual machine extensions that are not supported by CPU 108. In an embodiment, CPU 108 does not support NPT mode-based execute control. Rather, outer hypervisor 118 emulates NPT mode-based execute control and exposes this capability to its VMs, including VM 120.

At step 604, outer hypervisor 118 traps instructions executed by VM 120 that attempt to expose NPTs 138 to CPU 108. For example, the virtual machine extensions of CPU 108 can specify a root mode and a non-root mode. Kernel 134 of outer hypervisor 118 operates in root mode, whereas inner hypervisor 118 operates in non-root mode. Kernel 134 can restrict access to the virtual machine extensions of CPU 108, including attempts by a VM to expose NPTs to CPU 108.

Figure 7:
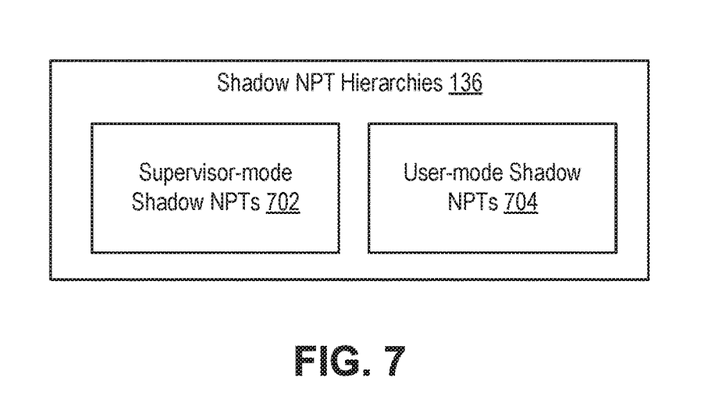
FIG. 7 is a block diagram depicting a structure of shadow NPT hierarchies according to an embodiment.

At step 606, outer hypervisor 118 generates shadow NPT hierarchies 136 based on a mode-based execute policy defined by VM 120. For example, kernel 134 can access NPTs 138 to obtain the mode-based execute policy. In response, kernel 134 can generate different shadow NPT hierarchies 136. FIG. 7 is a block diagram depicting the structure of shadow NPT hierarchies 136 according to an embodiment. In the embodiment, shadow NPT hierarchies 136 include a hierarchy of supervisor-mode shadow NPTs 702 and a hierarchy of user-mode shadow NPTs. Each shadow NPT hierarchy 136 maps guest physical pages to machine pages and specifies mode-agnostic execute policy supported by MMU 132. Supervisor-mode shadow NPTs 702 mark as executable (X) only those machine pages that are mapped to guest physical pages marked XS and XS+XU by NPTs 138. User-mode shadow NPTs 704 mark as executable (X) only those machine pages that are mapped to guest physical pages marked XS+XU and XU by NPTs 138.

Figure 8:
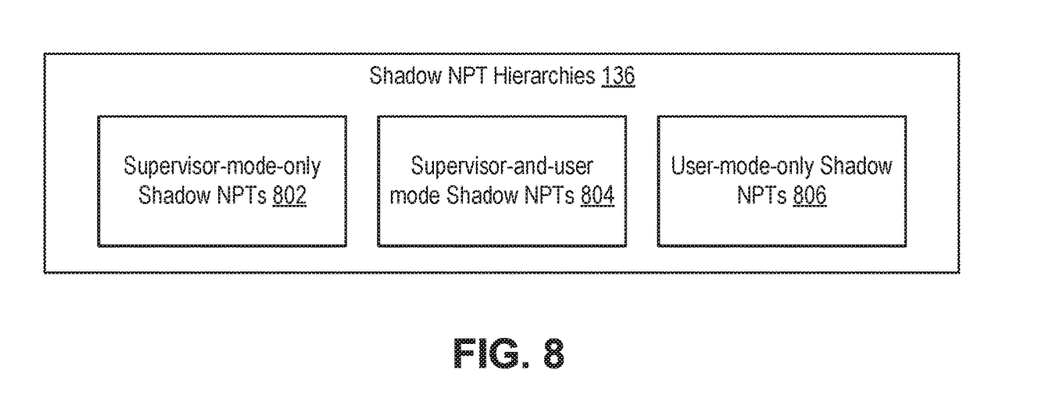
FIG. 8 is a block diagram depicting a structure of shadow NPT hierarchies according to another embodiment.

FIG. 8 is a block diagram depicting the structure of shadow NPT hierarchies 136 according to another embodiment. In the embodiment, shadow NPT hierarchies 136 include a hierarchy of supervisor-mode-only shadow NPTs 802, a hierarchy of supervisor-and-user-mode shadow NPTs 804, and a hierarchy of user-mode-only shadow NPTs 806. Each shadow NPT hierarchy 136 maps guest physical pages to machine pages and specifies mode-agnostic execute policy supported by MMU 132. Supervisor-mode-only shadow NPTs 802 mark as executable (X) only those machine pages that are mapped to guest physical pages marked XS by NPTs 138. Supervisor-and-user-mode shadow NPTs 804 mark as executable (X) only those machine pages that are mapped to guest physical pages marked XS+XU by NPTs 138. User-mode-only shadow NPTs 806 mark as executable (X) only those machine pages that are mapped to guest physical pages marked XU by NPTs 138.

Returning to FIG. 6, at step 608, outer hypervisor 118 configures CPU 108 to exit from VM 120 on an escalation from the user privilege level caused by guest code executing in VM 120. In general, kernel 134 can cause guest code executing in VM 120 to generate an exception in response to a privilege escalation from user-privilege (e.g., CPL3) to supervisor-privilege (e.g., CPL2, CPL1, CPL0). For example, kernel 134 can set the global descriptor table (GDT) and the interrupt descriptor table (IDT) limits for code segments to zero when guest code in VM 120 is executing in user-mode. This would cause an exception if user-mode code attempts reload CS register 200. Modern x86 processors support the syscall and sysenter instructions for executing system routines from user-mode, which also cause privilege escalation. Kernel 134 can set one or more registers 130 in CPU 108 so that execution of the syscall and sysenter instructions from user-mode throw exceptions. Thus, any action that results in changing CPL 202 would cause an exception. Kernel 134 can further cause a VM exit in response to any exceptions generated by user-mode code. In this manner, kernel 134 handles the exception due to privilege escalation from user-privilege rather than executive code in VM 120.

Figure 9:
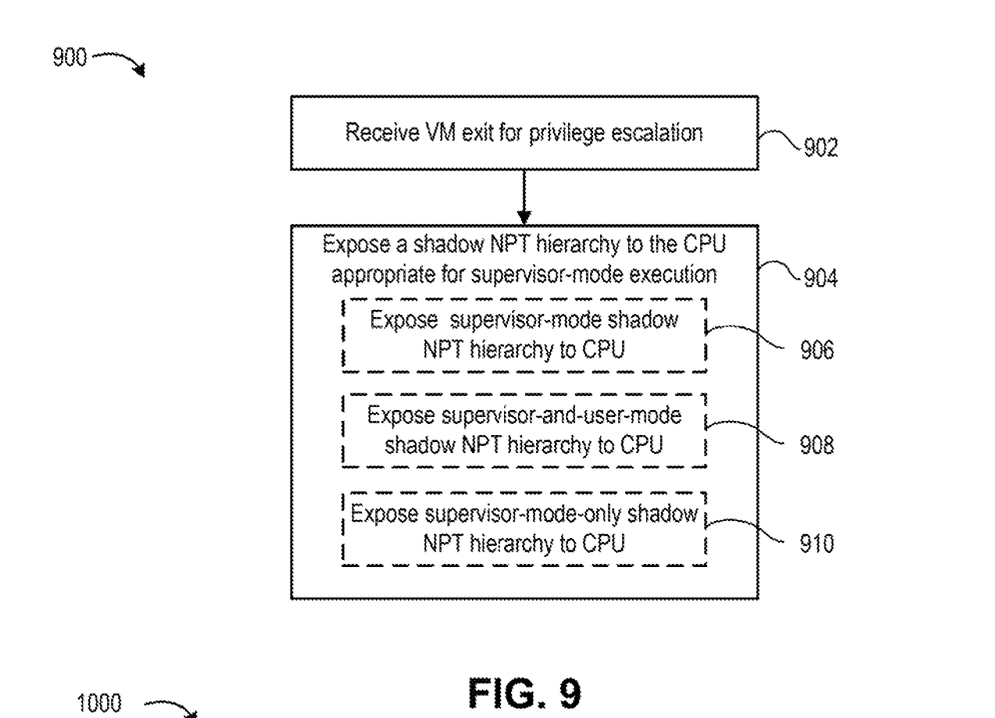
FIG. 9 is a flow diagram depicting a method of handling a virtual machine (VM) exit for privilege escalation from user-privilege according to an embodiment.

FIG. 9 is a flow diagram depicting a method 900 of handling a VM exit for privilege escalation from user-privilege according to an embodiment. Method 900 can be performed by outer hypervisor 118. Method 900 begins at step 902, where outer hypervisor 118 receives a VM exit for privilege escalation from user-privilege. For example, user-mode code of guest OS 126 can attempt to transfer program control to code in guest OS 126, security code 142, or inner hypervisor 122 that executes with supervisor privilege level (e.g., kernel-mode code at CPL0).

At step 904, outer hypervisor 118 exposes a shadow NPT hierarchy 136 to CPU 108 that is appropriate for supervisor-mode execution, i.e., a shadow NPT hierarchy 136 having execution (X) permission set based on XS and/or XS+XU permissions defined in NPTs 138. For example, kernel 134 can expose supervisor-mode shadow NPTs 702 to CPU 108 (Step 906). In this manner, supervisor-privileged code in VM 120 can execute from only pages marked XS or XS+XU in NPTs 138. In another example, kernel 134 can expose supervisor-only-mode shadow NPTs 802 (step 910). In this manner, supervisor-privileged code in VM 120 can execute from only pages marked XS in NPTs 138. In another example, kernel 134 can expose supervisor-and-user-mode shadow NPTs 804 to CPU 108 (step 908). In this manner, supervisor privileged code in VM 120 can execute from only pages marked XS+XU in NPTs 138. In the VBS example scheme discussed above, this allows for execution of only signed code in kernel-mode.

Returning to FIG. 6, if outer hypervisor 118 exposes either supervisor-mode shadow NPTs 702 or supervisor-only-mode shadow NPTs 802 to CPU 108, then there is a possibility that program flow will de-escalate to the user privilege level and continue executing from pages marked XS by NPTs 138 in violation of the established mode-based execution policy. This is because the supervisor-mode shadow NPTs 702 and supervisor-only-mode shadow NPTs 802 each mark as executable (X) machine pages that are mapped to guest physical pages marked XS by NPTs 138. Thus, at step 610, outer hypervisor 118 configures CPU 108 to exit from VM 120 on de-escalation to the user privilege level cause by code executing in VM 120.

In general, kernel 134 can cause a VM exit from VM 120 to outer hypervisor 118 in response to a privilege de-escalation to user-privilege (e.g., CPL3) from a supervisor-privilege (e.g., CPL2, CPL1, CPL0). For example, modern x86 processors allow root-level code to set an interrupt exiting window and/or non-maskable interrupt (NMI) exiting window that causes a VM exit when executive code in a VM becomes interruptable. This allows kernel 134 to receive a VM exit when guest code in VM 120 executes an IRET instruction from supervisor privilege (e.g., CPL0). In another example, kernel 134 can set one or more registers 130 to cause a VM exit when guest code in VM 120 executes a sysret or sysexit instruction from supervisor privilege.

Figure 10:
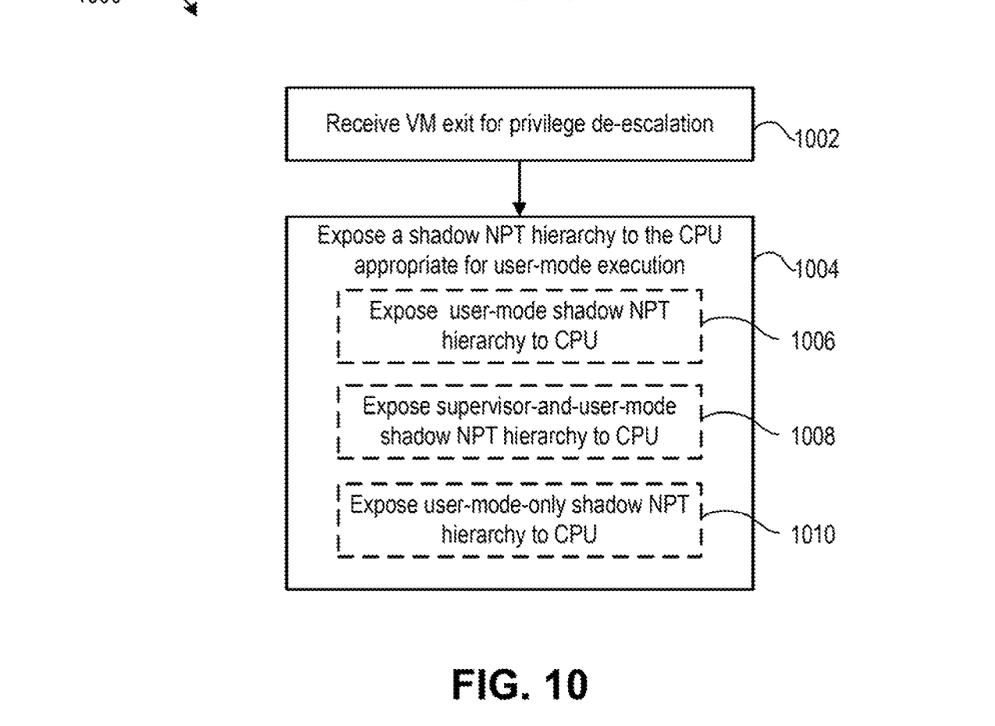
FIG. 10 is a flow diagram depicting a method of handling a VM exit for privilege de-escalation to user-privilege according to an embodiment.

FIG. 10 is a flow diagram depicting a method 1000 of handling a VM exit for privilege de-escalation to user-privilege according to an embodiment. Method 1000 can be performed by outer hypervisor 118. Method 1000 begins at step 1002, where outer hypervisor 118 receives a VM exit for privilege de-escalation to user-privilege. For example, supervisor-mode code in security code 142, guest OS 126, or inner hypervisor 122 can attempt to transfer program control back to user-mode code in guest OS 126 using an IRET, sysret, or sysexit instruction.

At step 1004, outer hypervisor 118 exposes a shadow NPT hierarchy 136 to CPU 108 that is appropriate for user-mode execution, i.e., a shadow NPT hierarchy 136 having execution (X) permission set based on XS+XU or XU permissions defined in NPTs 138. For example, kernel 134 can expose user-mode shadow NPTs 704 to CPU 108 (Step 1006). In this manner, user-privileged code in VM 120 can execute from only pages marked XS+XU or XU in NPTs 138. In another example, kernel 134 can expose user-only-mode shadow NPTs 806 (step 1010). In this manner, user-privileged code in VM 120 can execute from only pages marked XU in NPTs 138. In another example, kernel 134 can expose supervisor-and-user-mode shadow NPTs 804 to CPU 108 (step 1008). In this manner, user-privileged code in VM 120 can execute from only pages marked XS+XU in NPTs 138. In the VBS example scheme discussed above, this allows for execution of signed code or unsigned code in user-mode.

Returning to FIG. 6, in some embodiments, outer hypervisor 118 only emulates XS+XU and XU polices defined by NPTs 138. In such case, outer hypervisor 118 only switches between supervisor-and-user-mode shadow NPTs 804 and user-mode-only shadow NPTs 806. Further, in such case, step 610 of configuring VM exits in response to de-escalation to user-privilege can be omitted. Unlike in the case with supervisor-mode shadow NPTs 702 or supervisor-only-mode shadow NPTs 802, use of supervisor-and-user-mode shadow NPTs 804 and user-mode-only shadow NPTs 806 do not risk violation of the established mode-based execution policy in NPTs 138. Program control can return to user-mode from supervisor-mode and execute any page marked executable (X) by supervisor-and-user mode shadow NPTs 804. This is because supervisor-and-user-mode shadow NPTs 804 mark as executable (X) machine pages that are mapped to guest physical pages marked XS+XU by NPTs 138. If program control returns to user-mode and attempts to execute from an XU marked page, a VM exit is generated from VM 120 to outer hypervisor 118 due to an NPT violation. This is because supervisor-and-user-mode shadow NPTs 804 do not mark as executable (X) machine pages that are mapped to guest physical pages marked XU by NPTs 138. In response to the VM exit for NPT access violation, outer hypervisor 118 can expose user-mode-only shadow NPTs 806 and code in VM 120 can continue execution from the XU-marked page.

Figure 11:
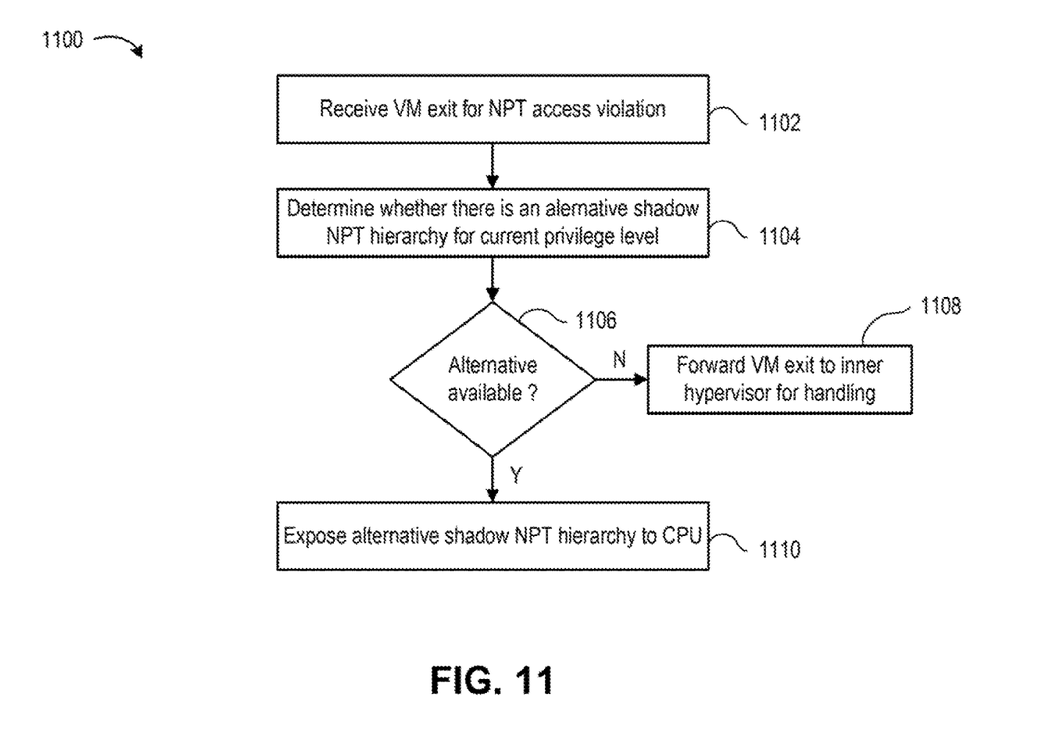
FIG. 11 is a flow diagram depicting a method of handling a VM exit for NPT access violation according to an embodiment.

FIG. 11 is a flow diagram depicting a method 1100 of handling a VM exit for NPT access violation according to an embodiment. Method 1100 can be performed by outer hypervisor 118. Method 1100 begins at step 1102, where outer hypervisor 118 receives a VM exit for NPT access violation. For example, outer hypervisor 118 may have exposed the supervisor-and-user mode shadow NPTs 804 to CPU 108 and user-mode code in VM 120 may be trying to execute from a guest physical page marked XU by NPTs 138. Guest physical pages marked XU by NPTs 138 do not have corresponding machine pages marked executable (X) in supervisor-and-user mode shadow NPTs 804. In another example, outer hypervisor 118 may have exposed the supervisor-and-user mode shadow NPTs 804 to CPU 108 and kernel-mode code in VM 120 may be trying to execute from a guest physical page marked XS by NPTs 138. Guest physical pages marked XS by NPTs 138 do not have corresponding machine pages marked executable (X) in supervisor-and-user mode shadow NPTs 804.

At step 1104, outer hypervisor 118 determines whether there is an alternative shadow NPT hierarchy 136 that is permitted based on the current privilege level. In the first example above, outer hypervisor 118 can switch to user-mode-only shadow NPTs 806 to allow the user-mode code to continue execution from guest physical pages marked XU by NPTs 138. In the second example above, outer hypervisor 118 can switch to supervisor-mode-only shadow NPTs 802 to allow kernel-mode code to continue execution from guest physical pages marked XS by NPTs 138. At step 1106, if there is an alternative shadow NPT hierarchy 136, method 1100 proceeds to step 1110. Otherwise, method proceeds to step 1108. At step 1110, outer hypervisor 118 exposes the alternative shadow NPT hierarchy 136 to CPU 108. At step 1108, outer hypervisor 118 forwards the VM exit to inner hypervisor 122 for handling. That is, if there is no alternative shadow NPT hierarchy 136, the code is attempting to access a guest physical page in violation of the mode-based execute policy specified by NPTs 138. Thus, outer hypervisor 118 forwards the VM exit to the inner hypervisor 122 to handle the violation of the established execute policy.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of emulating nested page table (NPT) mode-based execute control in a virtualized computing system, comprising:
   providing NPT mode-based execute control from a hypervisor to a virtual machine (VM) executing in the virtualized computing system, the NPT mode-based execute control having NPT fields that mark each of a plurality of memory pages as executable in combination with a privilege level of the execution of a plurality of privilege levels of a processor of the virtualized computing system;
   generating a plurality of shadow NPT hierarchies at the hypervisor based on an NPT mode-based execute policy obtained from the VM;
   configuring the processor to exit from the VM to the hypervisor in response to an escalation from a user privilege level to a supervisor privilege level caused by guest code of the VM;
   exposing a first shadow NPT hierarchy of the plurality of shadow NPT hierarchies to the processor in response to an exit from the VM to the hypervisor due to the escalation from the user privilege level to the supervisor privilege level;
   receiving an exit from the VM to the hypervisor due to an NPT access violation by the guest code of the VM; and
   searching the plurality of shadow NPT hierarchies for an alternative shadow NPT hierarchy permitted based on a current privilege level of the guest code of the VM.

2. The method of claim 1, further comprising:
   trapping, at the hypervisor, installation of an NPT hierarchy by the guest code in the VM; and
   obtaining the NPT mode-based execute policy from the NPT hierarchy.

3. The method of claim 1, wherein the NPT mode-based execute policy specifies user-only-executable (XU) memory pages and supervisor-and-user-executable (XS+XU) memory pages, and wherein the processor supports mode-agnostic NPT execute control, mode-agnostic NPT execute control marking memory pages as executable without reference to privilege level.

4. The method of claim 3, wherein:
   the plurality of shadow NPT hierarchies includes: (1) a supervisor-mode shadow NPT hierarchy that marks the XS+XU memory pages as executable memory pages, and (2) a user-mode shadow NPT hierarchy that marks both the XS+XU memory pages and the XU memory pages as executable memory pages; and
   the first shadow NPT hierarchy is the supervisor-mode shadow NPT hierarchy.

5. The method of claim 4, wherein the NPT mode-based execute policy further specifies supervisor-only-executable (XS) memory pages, and wherein the supervisor-mode shadow NPT hierarchy marks the XS memory pages as executable memory pages.

6. The method of claim 3, wherein:
   the NPT mode-based execute policy further specifies supervisor-only-executable (XS) memory pages;
   the plurality of shadow NPT hierarchies includes: (1) a supervisor-only-mode shadow NPT hierarchy that only marks the XS memory pages as executable memory pages, (2) a supervisor-and-user-mode shadow NPT hierarchy that only marks the XS+XU memory pages as executable memory pages, and (3) a user-only-mode shadow NPT hierarchy that only marks the XU memory pages as executable memory pages; and
   the first shadow NPT hierarchy is one of the supervisor-only-mode shadow NPT hierarchy or the supervisor-and-user-mode shadow NPT hierarchy.

7. The method of claim 1, further comprising:
   configuring the microprocessor to exit from the VM to the hypervisor on a de-escalation to the user privilege level from the supervisor privilege level caused by the guest code of the VM; and
   exposing a second shadow NPT hierarchy of the plurality of shadow NPT hierarchies to the processor in response to an exit from the VM to the hypervisor due to the de-escalation to the user privilege level from the supervisor privilege level.

8. The method of claim 1, further comprising, in response to finding the alternative shadow NPT hierarchy, exposing the alternative shadow NPT hierarchy to the processor.

9. The method of claim 1, further comprising, in response to not finding the alternative shadow NPT hierarchy, forwarding the exit from the VM due to the NPT access violation to the guest code of the VM.

10. The method of claim 1, wherein the hypervisor is an outer hypervisor, and wherein the guest code of the VM includes an inner hypervisor managing at least one inner VM.

11. A non-transitory computer readable medium having instructions stored thereon that when executed by a processor cause the processor to perform a method of emulating nested page table (NPT) mode-based execute control in a virtualized computing system, comprising:
   providing NPT mode-based execute control from a hypervisor to a virtual machine (VM) executing in the virtualized computing system, the NPT mode-based execute control having NPT fields that mark each of a plurality of memory pages as executable in combination with a privilege level of the execution of a plurality of privilege levels of the processor;
   generating a plurality of shadow NPT hierarchies at the hypervisor based on an NPT mode-based execute policy obtained from the VM;
   configuring the processor to exit from the VM to the hypervisor in response to an escalation from a user privilege level to a supervisor privilege level caused by guest code of the VM;
   exposing a first shadow NPT hierarchy of the plurality of shadow NPT hierarchies to the processor in response to an exit from the VM to the hypervisor due to the escalation from the user privilege level to the supervisor privilege level;
   receiving an exit from the VM to the hypervisor due to an NPT access violation by the guest code of the VM; and
   searching the plurality of shadow NPT hierarchies for an alternative shadow NPT hierarchy permitted based on a current privilege level of the guest code of the VM.

12. The non-transitory computer readable medium of claim 11, further comprising:
   trapping, at the hypervisor, installation of an NPT hierarchy by the guest code in the VM; and obtaining the NPT mode-based execute policy from the NPT hierarchy.

13. The non-transitory computer readable medium of claim 11, wherein the NPT mode-based execute policy specifies user-only-executable (XU) memory pages and supervisor-and-user-executable (XS+XU) memory pages, and wherein the processor supports mode-agnostic NPT execute control, mode-agnostic NPT execute control marking memory pages as executable without reference to privilege level.

14. The non-transitory computer readable medium of claim 13, wherein:
the plurality of shadow NPT hierarchies includes: (1) a supervisor-mode shadow NPT hierarchy that marks the XS+XU memory pages as executable memory pages, and (2) a user-mode shadow NPT hierarchy that marks both the XS+XU memory pages and the XU memory pages as executable memory pages; and
the first shadow NPT hierarchy is the supervisor-mode shadow NPT hierarchy.

15. The non-transitory computer readable medium of claim 14, wherein the NPT mode-based execute policy further specifies supervisor-only-executable (XS) memory pages, and wherein the supervisor-mode shadow NPT hierarchy marks the XS memory pages as executable memory pages.

16. The non-transitory computer readable medium of claim 13, wherein:
the NPT mode-based execute policy further specifies supervisor-only-executable (XS) memory pages;
the plurality of shadow NPT hierarchies includes: (1) a supervisor-only-mode shadow NPT hierarchy that only marks the XS memory pages as executable memory pages, (2) a supervisor-and-user-mode shadow NPT hierarchy that only marks the XS+XU memory pages as executable memory pages, and (3) a user-only-mode shadow NPT hierarchy that only marks the XU memory pages as executable memory pages; and
the first shadow NPT hierarchy is one of the supervisor-only-mode shadow NPT hierarchy or the supervisor-and-user-mode shadow NPT hierarchy.

17. The non-transitory computer readable medium of claim 11, further comprising:
configuring the microprocessor to exit from the VM to the hypervisor on a de-escalation to the user privilege level from the supervisor privilege level caused by the guest code of the VM; and
exposing a second shadow NPT hierarchy of the plurality of shadow NPT hierarchies to the processor in response to an exit from the VM to the hypervisor due to the de-escalation to the user privilege level from the supervisor privilege level.

18. The non-transitory computer readable medium of claim 11, wherein the hypervisor is an outer hypervisor, and wherein the guest code of the VM includes an inner hypervisor managing at least one inner VM.

19. A virtualized computer system, comprising:
a hardware platform including a processor and a memory, the processor configured to support nested page table (NPT) mode-agnostic execute control; and
a software platform executing on the hardware platform, the software platform including a hypervisor supporting a virtual machine (VM), the VM including guest code, the hypervisor configured to:
provide NPT mode-based execute control to the VM, the NPT mode-based execute control having NPT fields that mark each of a plurality of memory pages as executable in combination with a privilege level of the execution of a plurality of privilege levels of the processor;
generate a plurality of shadow NPT hierarchies based on an NPT mode-based execute policy obtained from the VM;
configure the processor to exit from the VM to the hypervisor in response to an escalation from a user privilege level to a supervisor privilege level caused by the guest code;
expose a first shadow NPT hierarchy of the plurality of shadow NPT hierarchies to the processor in response to an exit from the VM to the hypervisor due to the escalation from the user privilege level to the supervisor privilege level;
receive an exit from the VM to the hypervisor due to an NPT access violation by the guest code of the VM; and
search the plurality of shadow NPT hierarchies for an alternative shadow NPT hierarchy permitted based on a current privilege level of the guest code of the VM.

* * * * *